Aug. 23, 1932.   H. J. LANG   1,873,769
FLUID TEMPERATURE CONTROL
Filed March 3, 1931
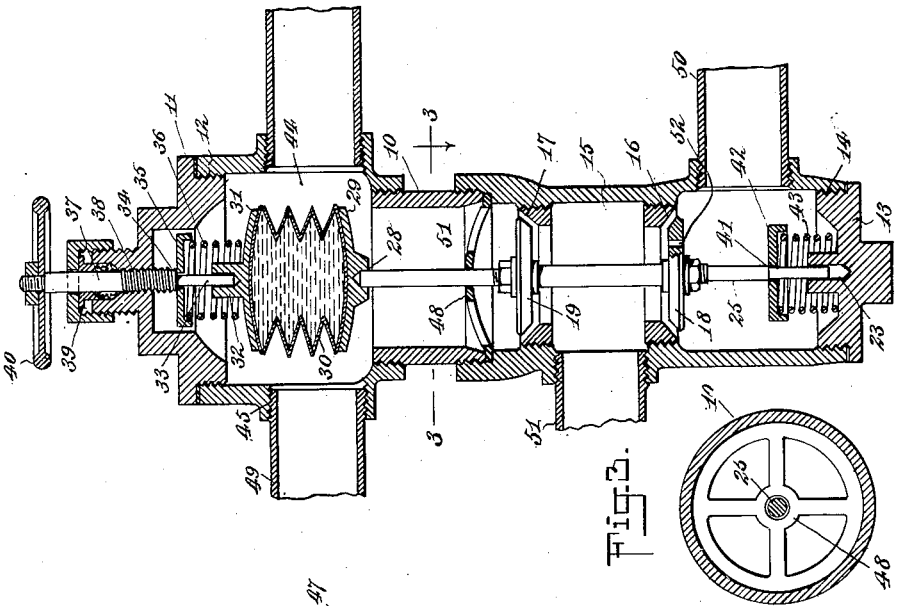
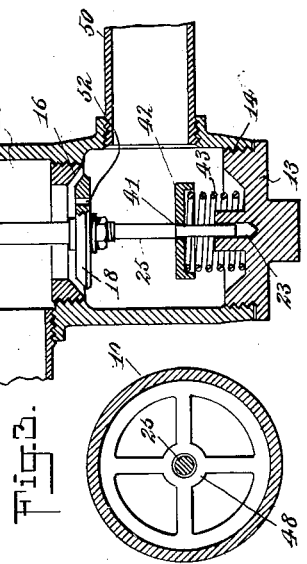
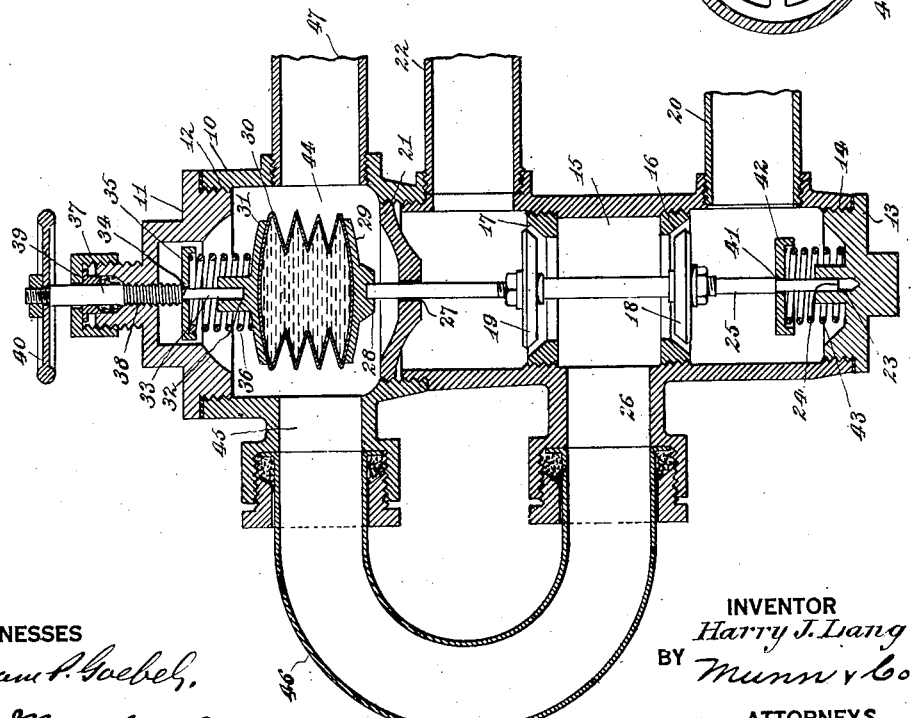
WITNESSES
INVENTOR
Harry J. Lang
BY Munn & Co.
ATTORNEYS Patented Aug. 23, 1932

1,873,769

UNITED STATES PATENT OFFICE

HARRY J. LANG, OF ADRIAN, MICHIGAN

FLUID TEMPERATURE CONTROL

Application filed March 3, 1931. Serial No. 519,848.

An object of the invention is to provide a device for controlling the temperature of a fluid at an outlet.

Another object of the invention is to provide such a device with two valves, one for controlling a hot fluid and the other for controlling a relatively cold fluid, the valves being connected so that either valve will be opened as the other valve is closed, or is partially closed, the two valves being operated by a thermostatic means in the path of a fluid passing through the device.

Still another object of the invention is to provide a fluid temperature control having a mixing chamber with opposite valve seats with the valves at the valve seats secured to a valve stem connected with a thermostatic means to be operated thereby. Preferably the thermostatic means is in an inlet through the device to be operated by a fluid passing therethrough, means being provided to regulate the said thermostatic means.

Additional objects of the invention will appear in the following specification in which the preferred form of the invention is described.

In the drawing similar reference characters refer to similar parts in all the views, of which Figure 1 is a sectional view illustrating the invention, Figure 2 is a sectional elevation illustrating a modified form of the invention, and Figure 3 is a view on the line 3—3 of Figure 2.

By referring to Figure 1 it will be seen that a casing 10 is provided having a head 11 which is secured to the body of the casing by means of threads 12, the casing 10 also having another head 13 which is secured to the body of the casing by means of threads 14. The casing 10 is provided with a mixing chamber 15 with opposite valve seats 16 and 17 which are commanded by valves 18 and 19 respectively. Between the head 13 and the valve seat 16 there is an inlet 20, which may be a cold water inlet, and between the valve seat 17 and a head 21 there is an inlet 22 which may be a hot water inlet.

The head 13 has a bearing 23 in which an end 24 of a valve stem 25 is disposed, the valves 18 and 19 being secured to this valve stem 25 with the valve 18 preferably disposed for closing the valve seat 16 when it moves upwardly and the valve 19 being preferably disposed for closing the valve seat 17 when the valve 19 moves downwardly. The valve seats 16 and 17 are of the same dimensions and the valves 18 and 19 are also of the same dimensions and it will, therefore, be understood that as the valve 18 is opened the valve 19 will be closed and as the valve 19 is closed the valve 18 will be opened so that the combined open areas at the valve seats 16 and 17 will be substantially the same at all times to permit an even flow of fluid from the mixing chamber 15 to the outlet 26.

The head 21 has a bearing 27 through which the valve stem 25 extends, the upper end of the valve stem 25 being seated in a seat 28 in the bottom member 29 of a thermostatic means, which is preferably a thermostatic bellows 30, as is shown in the drawing, the thermostatic bellows 30 being preferably filled with mercury. The top of the top member 31 of the thermostatic bellows has a bearing 32 in which is disposed the lower end of a spindle 33, the spindle 33 having a shoulder 34, a disc 35 being mounted on the spindle 33 and engaging the shoulder 34 to limit its upward movement. Disposed around the bearing 32 and the spindle 33, between the upper member 31 of the thermostatic means and the disc 35, there is a spring 36 which serves to hold the thermostatic means and the valve stem yieldingly downwardly to seat the valve 19 at the valve seat 17 and to move the valve 18 away from the valve seat 16. The upper end 37 of the spindle 33 has a threaded engagement 38 with the head 11 for purposes of adjustment, the upper portion 37 of the spindle 33 passing through a packing gland 39 and having a hand wheel 40 by which it may be rotated.

The lower portion of the valve stem 25 has a shoulder 41 and there is a disc 42 mounted on this spindle pressing against the shoulder, a spring 43 being disposed between the disc 42 and the head 13. With this construction it will be understood that the springs 43 and 36 will hold the valves yieldingly in adjusted position and the adjustment may be changed by means of the spindle 37 which may be rotated to move the disc 35 downwardly, or permit the disc 35 to assume a new upward position, as may be desired.

The thermostatic bellows 30 is disposed in a passageway 44 and the outlet 26 of the mixing chamber 15 is connected with the inlet 45 to this passageway by means of a communicating means 46, the passageway 44 having an outlet 47.

It will be understood that, in the operation of the device, the amount of cold water relatively to the amount of hot water which enters the mixing chamber 15 will be regulated by means of the thermostatic bellows 30, which is in turn actuated by means of the temperature of the fluid passing through the passageway 44.

In the modified form of the invention illustrated in Figure 2, the construction is the same with the exception that the head 21 is eliminated and a spider bearing 48 is employed in which the valve stem 25 is journaled. The inlet 22 is also eliminated in the construction illustrated in Figure 2. In this construction, which is of particular value where engines or machines are used with water for cooling purposes, the discharge of the machine is shown at 49, which enters the casing inlet 45, the temperature of the water or other fluid passing through the passageway 44 to the outlet 47, which may be led to a radiator, actuating the thermostatic bellows 30, and serving, when the valve 19 is raised, to open communication between the passageway 44 and the mixing chamber 15, the water or fluid passing through the valve seat 17 mixing in the mixing chamber 15 with the water or fluid from the radiator passing through the communicating means 50 to the casing 10 and through the valve seat 16, the water or fluid being forced from the mixing chamber 15 by a circulating pump through a communicating means 51. In other ways, the construction illustrated in Figure 2 corresponds with the construction illustrated in Figure 1, with the exception that the valve 18 may be provided with a priming orifice 52.

What is claimed is:

1. A fluid temperature control having a casing with two inlets spaced apart and a mixing chamber disposed between the inlets, two valve seats in the casing at the mixing chamber, one valve seat separating the mixing chamber from one of the inlets and the other valve seat separating the mixing chamber from the other inlet, an outlet from the casing at the mixing chamber, two valves, one at each valve seat, there being a transverse passageway in the casing with an inlet in the casing to the passageway and an outlet in the casing from the passageway, a thermostatic means in the passageway, and a valve stem connecting the thermostatic means with the valves for operating the latter.

2. A fluid temperature control having a casing with a mixing chamber and valve seats, one at a cold fluid inlet to the mixing chamber and the other at a relatively warm fluid inlet to the mixing chamber, valves at the valve seats, there being a passageway in the casing, a thermostatic means in the passageway, a valve stem connecting the thermostatic means with the valves for operating the latter, a disc secured to the valve stem, a resilient means between the disc and the casing for holding the valve stem yieldingly in one direction, a spindle adjacent the thermostatic means, a disc secured to the spindle, a resilient means between the disc and the thermostatic means for holding the valve stem yieldingly in the opposite direction, the spindle being adjustable relatively to the casing.

3. A fluid temperature control having a casing with a bearing and a mixing chamber, two valve seats, one at a cold fluid inlet to the mixing chamber and the other at a relatively warm fluid inlet to the mixing chamber, an outlet from the casing at the mixing chamber, valves at the valve seats, there being a transverse passageway in the casing leading from an inlet to the casing to an outlet from the casing, a thermostatic means having opposite bearings and disposed in the passageway, a valve stem disposed in one of the bearings in the thermostatic means secured to the valves for operating the latter, the valve stem having one end disposed in the bearing in the casing, a disc secured to the valve stem, a resilient means between the disc and the casing for holding the valve stem yieldingly in one direction, a spindle in the other bearing in the thermostatic means, a disc secured to the spindle, resilient means between the second mentioned disc and the thermostatic means for holding the thermostatic means and the valve stem yieldingly in the opposite direction, and means in connection with the casing for adjusting the position of the spindle.

4. A fluid temperature control having a casing with a transverse passageway and a mixing chamber with two valve seats leading thereto and two inlets, one disposed beyond each valve seat, a thermostatic means in the passageway, a valve stem connecting the thermostatic means with the valves for operating the latter, an inlet to the casing at the transverse passageway, an outlet from the casing at the transverse passageway, an outlet to the casing at the mixing chamber, a communicating means connecting the outlet at the mixing chamber with the inlet at the passage, resilient means for pressing the valve stem in one direction, resilient means for pressing the valve stem in the opposite direction, and means for regulating the action of one of the resilient means.

5. A fluid temperature control having a casing with a passageway and a mixing chamber with two valve seats, there being an inlet in the casing leading through one of the valve seats to the mixing chamber, the passageway having communication through the other valve seat with the mixing chamber, valves at the valve seats, a valve stem secured to the valves, and a thermostatic means in the passageway connected with the valve stem for moving the latter.

6. A fluid temperature control having a casing with a passageway and a mixing chamber with two valve seats, there being an inlet in the casing leading through one of the valve seats to the mixing chamber, the passageway having communication through the other valve seat with the mixing chamber, valves at the valve seats, a valve stem secured to the valves, and a thermostatic means in the passageway connected with the valve stem for moving the latter, there being a priming orifice in one of the valves.

7. A fluid temperature control having a casing with a transverse passageway and a mixing chamber with oppositely disposed valve seats, there being an inlet in the casing leading through one of the valve seats to the mixing chamber, the transverse passageway having communication through the other valve seat with the mixing chamber, an inlet to the casing at the transverse passageway, an outlet from the casing at the transverse passageway, an outlet from the casing at the mixing chamber, valves at the valve seats, a valve stem secured to the valves, and a thermostatic means in the transverse passageway connected with the valve stem for moving the latter.

HARRY J. LANG.